(12) United States Patent
Goodfellow

(10) Patent No.: US 9,314,742 B2
(45) Date of Patent: Apr. 19, 2016

(54) METHOD AND SYSTEM FOR REVERSE OSMOSIS PREDICTIVE MAINTENANCE USING NORMALIZATION DATA

(75) Inventor: John A. Goodfellow, Waterloo (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 734 days.

(21) Appl. No.: 12/752,024

(22) Filed: Mar. 31, 2010

(65) Prior Publication Data
US 2011/0240557 A1     Oct. 6, 2011

(51) Int. Cl.
| | |
|---|---|
| *B01D 61/02* | (2006.01) |
| *B01D 65/00* | (2006.01) |
| *B01D 61/08* | (2006.01) |
| *B01D 61/12* | (2006.01) |
| *B01D 63/10* | (2006.01) |
| *B01D 65/02* | (2006.01) |

(52) U.S. Cl.
CPC .............. *B01D 61/022* (2013.01); *B01D 61/12* (2013.01); *B01D 63/10* (2013.01); *B01D 65/02* (2013.01); *B01D 2311/10* (2013.01); *B01D 2311/14* (2013.01); *B01D 2311/16* (2013.01); *B01D 2311/243* (2013.01); *B01D 2311/246* (2013.01); *B01D 2321/40* (2013.01)

(58) Field of Classification Search
CPC ...... B01D 61/02; B01D 61/022; B01D 61/08; B01D 61/10; B01D 61/12; B01D 63/10; B01D 63/12; B01D 65/02; B01D 2311/08; B01D 2311/10; B01D 2311/14; B01D 2311/16; B01D 2311/243; B01D 2311/246; B01D 2321/40
See application file for complete search history.

(56) References Cited

U.S. PATENT DOCUMENTS

| | | | |
|---|---|---|---|
| 3,640,084 A | 2/1972 | Hopkins et al. | |
| 3,744,264 A | 7/1973 | Ware | |
| 3,744,273 A | 7/1973 | Ware | |
| 3,864,929 A | 2/1975 | Hopkins | |
| 3,864,930 A | 2/1975 | Hopkins | |

(Continued)

FOREIGN PATENT DOCUMENTS

| | | |
|---|---|---|
| JP | 63004808 | 1/1988 |
| JP | 6254553 | 9/1994 |

(Continued)

OTHER PUBLICATIONS

Trane Engineers Newsletter, vol. 20, No. 3, 1991, 7 Pages.

*Primary Examiner* — David C Mellon
(74) *Attorney, Agent, or Firm* — Snell & Wilmer LLP

(57) ABSTRACT

The present invention can include a reverse osmosis unit, a control system, a display, and/or a memory. The reverse osmosis unit can include a filtration unit, a liquid utilization system, and/or an instrumentation system. The filtration unit includes a plurality of filter banks which each have a plurality of filter unit. The filtration unit receives a feed liquid and generates permeate and concentrate. The permeate is sent to the liquid utilization system, while the concentrate is removed. The instrumentation system can include a plurality of sensors to detect operational data of the feed liquid, permeate, and/or concentrate. Using the operational data and equations, the control unit can calculate the normalized permeate flow rate indicating whether the filters should be cleaned and/or replaced. The operational data and the equations can be used to determine whether the pressure and/or flow can be manipulated without damaging the filters.

18 Claims, 8 Drawing Sheets

(56) References Cited

U.S. PATENT DOCUMENTS

| | | | |
|---|---|---|---|
| 3,992,301 A | 11/1976 | Shippey et al. | |
| 4,141,825 A | 2/1979 | Conger | |
| 4,163,445 A | 8/1979 | Stanger | |
| 4,176,057 A | 11/1979 | Wheatley et al. | |
| 4,214,626 A | 7/1980 | Spethmann | |
| 4,347,704 A | 9/1982 | Marquardt et al. | |
| 4,391,102 A | 7/1983 | Studhalter et al. | |
| 4,406,138 A | 9/1983 | Nelson | |
| 4,446,703 A | 5/1984 | Gilbertson | |
| 4,772,385 A * | 9/1988 | Yamada et al. | 210/87 |
| 4,921,610 A | 5/1990 | Ford et al. | |
| 5,040,377 A | 8/1991 | Braun et al. | |
| 5,101,639 A | 4/1992 | Wruck et al. | |
| 5,131,236 A | 7/1992 | Wruck et al. | |
| 5,131,238 A | 7/1992 | Meckler | |
| 5,133,193 A | 7/1992 | Wruck et al. | |
| 5,138,842 A | 8/1992 | Wruck et al. | |
| 5,170,635 A | 12/1992 | Wruck et al. | |
| 5,172,565 A | 12/1992 | Wruck et al. | |
| 5,198,116 A | 3/1993 | Comstock et al. | |
| 5,484,536 A * | 1/1996 | Yamaguchi | B01D 29/114 210/108 |
| 5,498,338 A | 3/1996 | Kruger et al. | |
| 5,651,894 A | 7/1997 | Boyce et al. | |
| 5,797,275 A | 8/1998 | Forsman | |
| 5,925,255 A * | 7/1999 | Mukhopadhyay | 210/652 |
| 6,017,459 A * | 1/2000 | Zeiher | B01D 61/12 210/321.6 |
| 6,066,254 A * | 5/2000 | Huschke | B01D 61/10 210/282 |
| 6,074,551 A | 6/2000 | Jones et al. | |
| 6,077,435 A | 6/2000 | Beck et al. | |
| 6,185,943 B1 | 2/2001 | Kopko | |
| 6,273,271 B1 * | 8/2001 | Moya | B01D 67/0088 210/490 |
| 6,332,110 B1 | 12/2001 | Wolfe | |
| 6,556,930 B1 | 4/2003 | Lueck | |
| 6,560,543 B2 | 5/2003 | Wolfe et al. | |
| 6,609,070 B1 * | 8/2003 | Lueck | 702/50 |
| 6,640,561 B2 | 11/2003 | Roberto | |
| 6,644,049 B2 | 11/2003 | Alford | |
| 6,730,227 B2 | 5/2004 | Zeiher et al. | |
| 6,823,684 B2 | 11/2004 | Jensen | |
| 6,838,001 B2 * | 1/2005 | Zeiher et al. | 210/639 |
| 7,036,330 B2 | 5/2006 | Grabon et al. | |
| 7,104,115 B2 | 9/2006 | Kahn et al. | |
| 7,174,273 B2 | 2/2007 | Goldberg | |
| 7,216,698 B2 | 5/2007 | Catzel | |
| 7,371,319 B2 | 5/2008 | Wood et al. | |
| 7,416,644 B2 | 8/2008 | Bonde | |
| 7,581,409 B2 | 9/2009 | Bailey et al. | |
| 7,591,309 B2 | 9/2009 | Minnich et al. | |
| 7,658,079 B2 | 2/2010 | Bailey et al. | |
| 7,749,386 B2 | 7/2010 | Voutchkov | |
| 8,048,311 B2 | 11/2011 | Wallace et al. | |
| 8,075,740 B2 | 12/2011 | Bailie et al. | |
| 8,529,681 B1 * | 9/2013 | Hibbs et al. | 106/18.21 |
| 2003/0000230 A1 | 1/2003 | Kopko | |
| 2003/0015471 A1 | 1/2003 | Reichwein et al. | |
| 2006/0010893 A1 | 1/2006 | Dominguez | |
| 2006/0032823 A1 * | 2/2006 | Harrison et al. | 210/754 |
| 2007/0151925 A1 * | 7/2007 | de los Reyes et al. | 210/641 |
| 2007/0283716 A1 | 12/2007 | Marsala | |
| 2008/0016890 A1 | 1/2008 | Dominguez | |
| 2008/0023410 A1 * | 1/2008 | Efraty | 210/741 |
| 2009/0050555 A1 * | 2/2009 | Baba | B01D 63/02 210/321.69 |
| 2009/0171512 A1 | 7/2009 | Duncan | |
| 2009/0260381 A1 | 10/2009 | Bittner et al. | |
| 2010/0023166 A1 | 1/2010 | Chessel et al. | |
| 2010/0036530 A1 | 2/2010 | Chessel et al. | |
| 2010/0036531 A1 | 2/2010 | Chessel et al. | |
| 2010/0042265 A1 | 2/2010 | Rigal et al. | |
| 2010/0050669 A1 | 3/2010 | Poux et al. | |
| 2010/0065650 A1 | 3/2010 | Phillips | |
| 2010/0070082 A1 | 3/2010 | Chessel et al. | |
| 2010/0077776 A1 | 4/2010 | Takenami et al. | |
| 2010/0078160 A1 | 4/2010 | Novotny et al. | |
| 2010/0094465 A1 | 4/2010 | Chessel et al. | |
| 2011/0035195 A1 * | 2/2011 | Subbiah | B01D 61/12 703/2 |

FOREIGN PATENT DOCUMENTS

| | | |
|---|---|---|
| JP | 6254554 | 9/1994 |
| JP | 10192853 | 7/1998 |
| JP | 2001062255 | 3/2001 |
| JP | 2004108864 | 4/2004 |
| JP | 2005052793 | 3/2005 |

* cited by examiner

METHOD AND SYSTEM FOR REVERSE OSMOSIS PREDICTIVE MAINTENANCE USING NORMALIZATION DATA

BACKGROUND

1. Field

The present invention relates to a method and system for reverse osmosis predictive maintenance using normalization data.

2. Description of the Related Art

Conventional reverse osmosis units receive feed water and use filter banks to filter the feed water to remove deposits and generate permeate and concentrate. The permeate is the feed water with the deposits removed, while the concentrate is the excess waste. The percentage of permeate relative to the overall feed water is the percent recovery. However, performance of the reverse osmosis units is often dependent on the pressure of the feed water and the cleanliness of the filter banks. Thus, when the percent recovery is low, conventional methods and systems generally increase the pressure of the feed water, clean the filter banks, or replace the filter banks. However, increasing the feed water can damage the filter banks, necessitating their replacement, which can be costly over time. Furthermore, filter banks can also be cleaned only a limited amount of times before they must be replaced. Thus, if they are cleaned before they really need to be cleaned, they may need to be replaced quickly. Replacing the filter banks can also be expensive.

Thus, there is a need for a method and system for reverse osmosis predictive maintenance using normalization data.

SUMMARY

The present invention relates to a method and system for reverse osmosis predictive maintenance using normalization data. In one embodiment, the present invention includes a reverse osmosis system. The reverse osmosis system can include a reverse osmosis unit, a control system, a display, and/or a memory. The reverse osmosis unit can include a pre-filter, a pump, a filtration unit, a liquid utilization system, and/or an instrumentation system. The pump can supply feed liquid to the filtration unit. The filtration unit includes a plurality of filter banks which each have a plurality of filters. The filtration unit filters the feed liquid to generate permeate and concentrate. The permeate is sent to the liquid utilization system, while the concentrate is removed. The instrumentation system can include a plurality of sensors to detect operational data of the feed liquid such as pressure data, flow data, percent recovery, temperature data, and/or conductivity data of the feed liquid, the permeate, and/or the concentrate. The operational data can be stored in the database along with equations for assessing the operational data.

Using the operational data and the equations, the control unit can calculate the normalized permeate flow rate, which can be used to more accurately indicate whether the filters should be cleaned and/or replaced. Furthermore, the operational data and the equations can be used to determine whether the pressure and/or the flow can be increased to increase the percent recovery without damaging the filters. If the filters need to be replaced and/or cleaned, a warning can be indicated on the display.

In one embodiment, the present invention is a reverse osmosis system including a reverse osmosis unit including a plurality of filter banks and generating permeate, an instrumentation system detecting operational data from the reverse osmosis unit, the operational data including a permeate flow rate of the permeate, and a control system analyzing the operational data to determine a normalized permeate flow rate, and determining when the plurality of filter banks should be cleaned or replaced based on the normalized permeate flow rate.

In another embodiment, the present invention is a reverse osmosis system including a reverse osmosis unit including a first filter bank and a second filter bank, the reverse osmosis unit receiving feed water and generating permeate, a first pressure sensor detecting a feed pressure of the reverse osmosis unit, a second pressures sensor detecting a rejection pressure of the first filter bank, a third pressure sensor detecting a rejection pressure of the second filter bank, and a permeate sensor detecting a permeate flow rate of the permeate. The present invention can also include a control system analyzing the feed pressure, the rejection pressure of the first filter bank, the rejection pressure of the second filter bank, and the permeate flow rate to determine a normalized permeate flow rate. The control system can further determine when the first filter bank or the second filter bank should be cleaned or replaced based on the normalized permeate flow rate, and a display connected to the control system and configured to display a warning when the first filter bank or the second filter bank should be cleaned or replaced.

In yet another embodiment, the present invention is a method for operating a reverse osmosis system including detecting a permeate flow rate of permeate generated by the reverse osmosis system, detecting operational data of the reverse osmosis system, analyzing the operational data to determine a normalized permeate flow rate, and determining when filter banks in the reverse osmosis system should be cleaned or replaced based on the normalized permeate flow rate.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Figure 1:
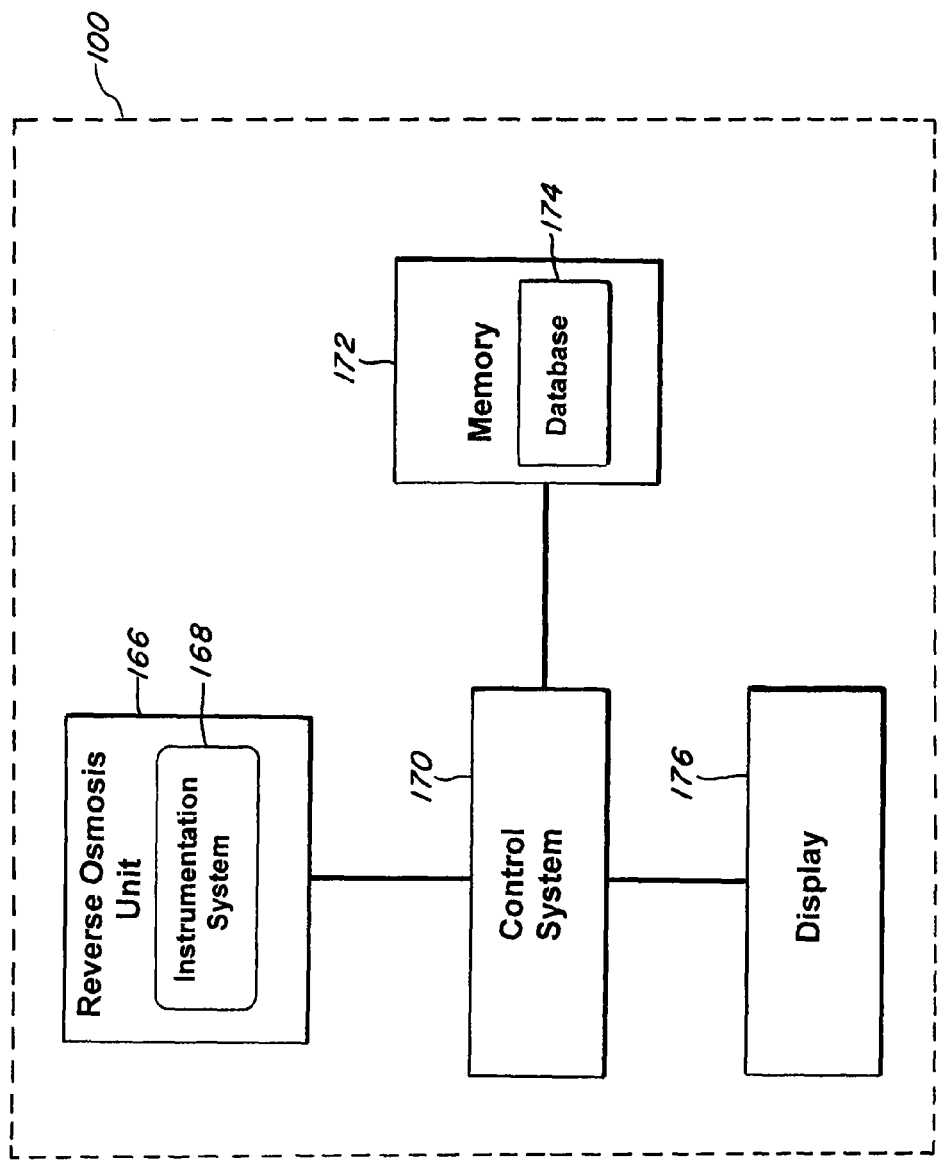
FIG. 1 is a block diagram of a reverse osmosis system according to an embodiment of the present invention.

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

In one embodiment, the present invention includes a reverse osmosis system 100. The reverse osmosis system 100 can include, for example, a reverse osmosis unit 166, a control system 170, a memory 172, and/or a display 176.

The reverse osmosis unit 166 is connected to the control system 170. The reverse osmosis unit 166 can, for example, receive a feed liquid and filter the feed liquid to generate concentrate and permeate. The concentrate can be, for example, impurities in the feed liquid, while the permeate can be, for example, the filtered liquid. Thus, the reverse osmosis unit 166 can substantially remove particles such as particulates in the feed liquid. The feed liquid can be, for example, water, juice, alcohol, or any other type of liquid which requires filtering. The reverse osmosis unit 166 can include, for example, an instrumentation system 168 generating operational data of the reverse osmosis unit 166 and a filtration unit to filter the feed liquid. The filtration unit can contain a plurality of filter banks, each filter bank containing a plurality of filters.

Figure 2:
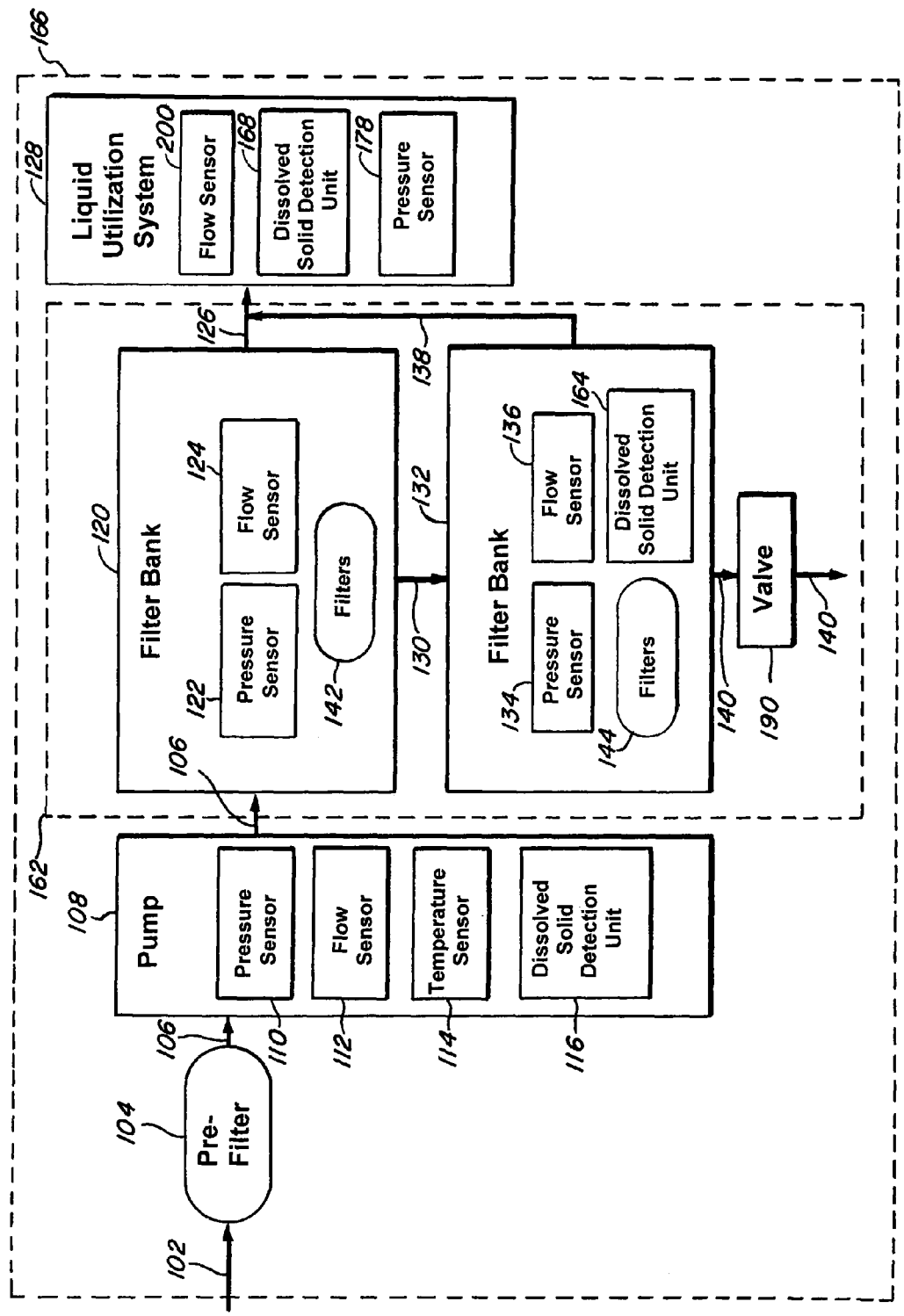
FIG. 2 is a block diagram of a reverse osmosis unit according to an embodiment of the present invention.

The reverse osmosis unit 166 can be seen, for example, in FIG. 2. In FIG. 2, the reverse osmosis unit 166 can include a pre-filter 104, a pump 108, a filtration unit 162, and/or a liquid utilization system 128. The instrumentation system 168 can include various instruments located in various parts of the reverse osmosis unit 166, such as a pressure sensor 110, a flow sensor 112, a temperature sensor 114, a dissolved solid detection unit 116, a pressure sensor 122, a flow sensor 124, a pressure sensor 134, a flow sensor 136, a dissolved solid detection unit 164, a flow sensor 200, a dissolved solid detection unit 168, and/or a pressure sensor 178.

The pre-filter 104 receives a feed liquid 102, preliminary filters the feed liquid 102 to form the feed liquid 106, and transmits the feed liquid 106 to a pump 104. The pump 108 receives the feed liquid 106 and pumps the feed liquid 106 to the filtration unit 162. The pump 108 can also include the pressure sensor 110, the flow sensor 112, the temperature sensor 114, and the dissolved solid detection unit 116.

The pressure sensor 110 can detect pressure data, such as feed liquid pressure data indicating a pressure of the feed liquid 106. The flow sensor 112 can detect flow rate data, such as feed liquid flow rate data indicating a flow rate of the feed liquid 106. The temperature sensor 114 can detect temperature data, such as feed liquid temperature data. The feed liquid temperature data can indicate a temperature of the feed liquid 106. The dissolved solid detection unit 116 can detect dissolved solid data. The dissolved solid data can indicate an amount of dissolved solid in the feed liquid 106. The dissolved solid data can include, for example, feed liquid conductivity data indicating conductivity of the feed liquid 106. The conductivity of the feed liquid 106 can indicate, for example, an amount of dissolved solid in the feed liquid 106.

The filtration unit 162 filters the feed water 102 to generate a permeate 126 and a concentrate 140. The permeate 126 is sent to the liquid utilization system 128, while the concentrate 140 is disposed. The filtration unit 162 includes, for example, a filter bank 120, a filter bank 132, and/or a valve 190. The filter bank 120 receives the feed liquid 106 and generates concentrate 130 and a first portion of the permeate 126. The filter bank 120 includes, for example, the filters 142, the pressure sensor 122, the flow sensor 124, and/or the dissolved solid detection unit 116.

Figure 3:
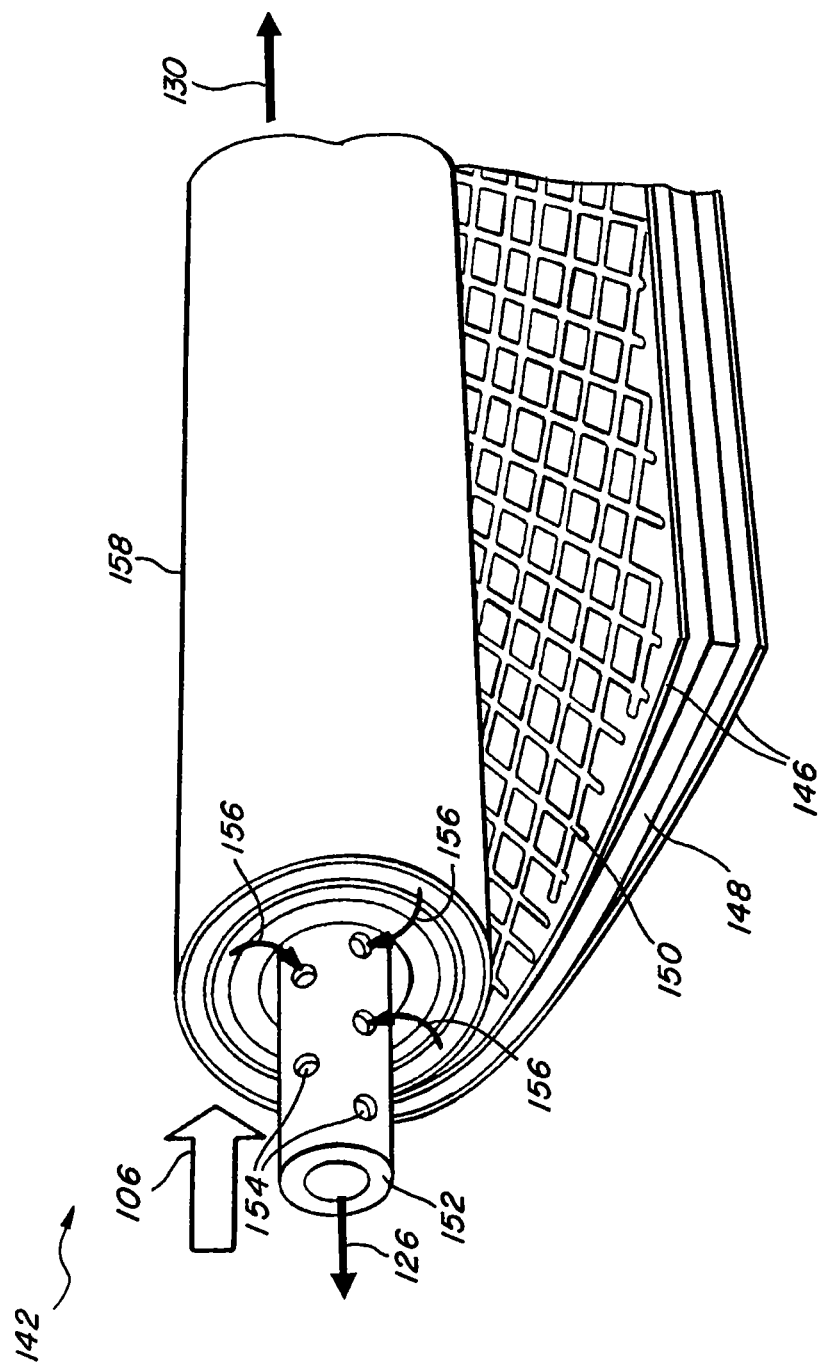
FIG. 3 depicts a filter according to an embodiment of the present invention.

An exemplary view of one of the filters 142 with an unwrapped membrane can be seen, for example, in FIG. 3. As seen in FIG. 3, the filter 142 can include a filtering membrane unit 158, and/or a pipe 152. The filtering membrane unit 158 is depicted in an unwrapped manner merely to provide a better perspective of the filtering membrane unit 158. The filtering membrane unit 158 can include, for example, membranes 146, a porous support 148, and/or a mesh 150. Each of the membranes 146 can have, for example, over 400 square feet of membrane surface. The pipe 156 can include, for example, a plurality of holes 154 for allowing filtered water to enter an interior of the pipe 156. The holes 154 can be selectively sized to reduce the likelihood of undesirable particulates entering the interior of the pipe 156 from the filtering membrane unit 158.

Thus, the filtering membrane unit 158 can receive and filter the feed liquid 106. The filtered feed liquid 106 flows through the holes 154 as indicated by the arrows 156 into the interior of the pipe 152. The filtered feed liquid 106 is then transported as the first portion of the permeate 126. The remaining feed liquid 106 exits the filtering membrane unit 158 and the filter 142 as the concentrate 130.

The pressure sensor 122 (FIG. 2) can detect, for example, rejection pressure data of the filters 142, such as a first stage rejection pressure data. The first stage rejection pressure data can include an aggregate or average rejection pressure of the filters 142. The rejection pressure of the filters 142 can be pressure corresponding to the concentrate 130 exiting the filtering membrane unit 158 and the filters 142. The flow sensor 124 (FIG. 2) can detect, for example, a rejection flow rate of the filters 142, which can include an aggregate or average rejection flow rate of the filters 142. The rejection flow rate of the filters 142 can be, for example, a flow rate corresponding to the concentrate 130 exiting the filtering membrane unit 158 and the filters 142.

Referring back to FIG. 2, the filter bank 132 receives the concentrate 130 and generates concentrate 140 and a second portion of the permeate 126. The filter bank 132 includes, for example, filters 144, the pressure sensor 134, and/or the flow sensor 136.

Figure 4:
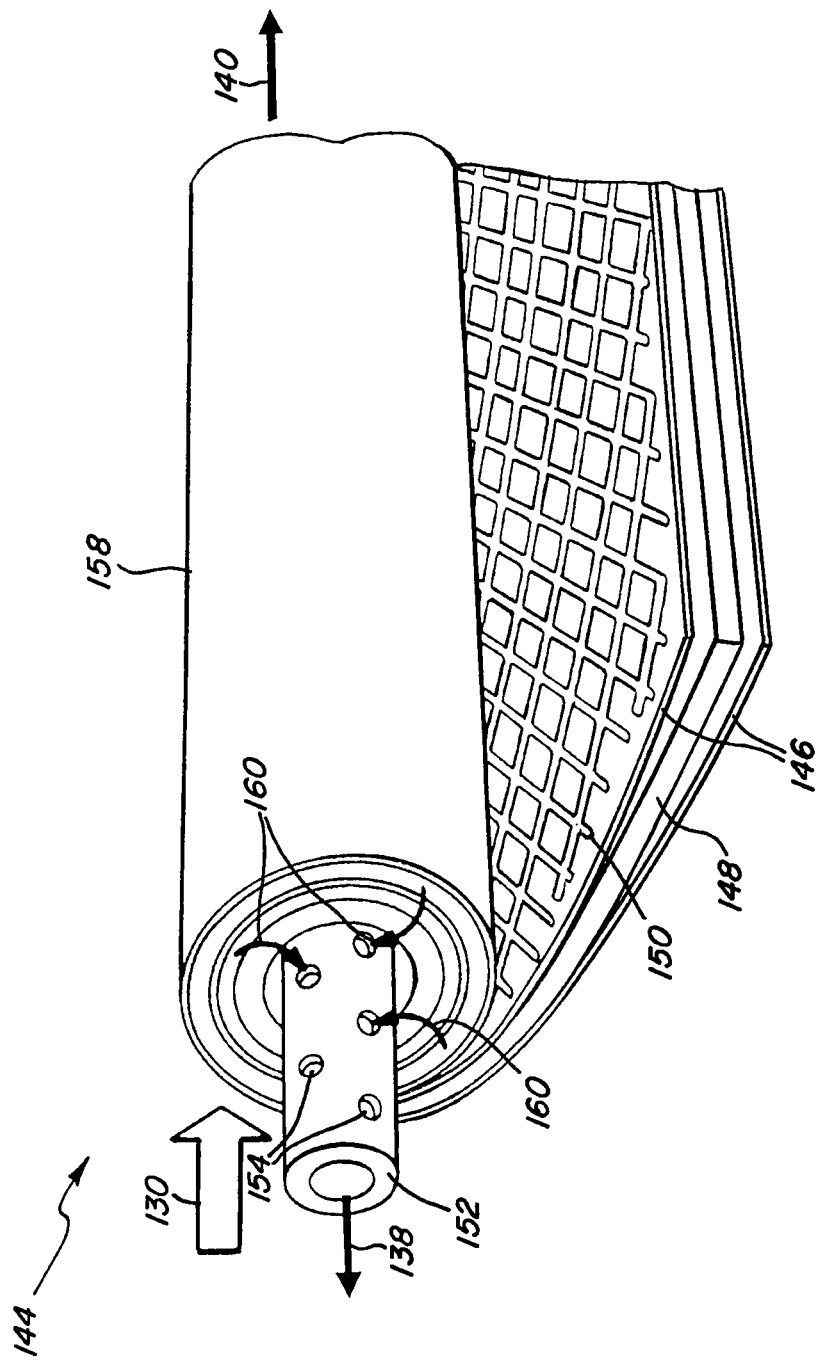
FIG. 4 depicts a filter according to an embodiment of the present invention.

An exemplary view of one of the filters 144 with an unwrapped membrane can be seen, for example, in FIG. 4. The filters 144 have a similar construction as the filters 142. Thus, the filtering membrane unit 158 can receive and filter the concentrate 130. The filtered concentrate 130 flows through the holes 154 as evidenced by the arrows 160 into the interior of the pipe 152. The filtered concentrate 130 is then transported as a second portion of the permeate 126. The remaining concentrate 130 exits the filtering membrane unit 158 and the filter 144 as the concentrate 140.

The pressure sensor 134 (FIG. 2) can detect, for example, rejection pressure data of the filters 144, such as a second stage rejection pressure data. The second stage rejection pressure data can include an aggregate or average rejection pressure of the filters 144. The rejection pressure of the filters 144 can be, for example, pressure corresponding to the concentrate 140 exiting the filtering membrane unit 158 and the filters 144.

The flow sensor 136 (FIG. 2) can detect, for example, a rejection flow rate of the filters 144, which can include an aggregate or average rejection flow rate of the filters 144. The rejection flow rate of the filters 144 can be, for example, a flow rate corresponding to the concentrate 140 exiting the filtering membrane unit 158 and the filters 144. The dissolved solid detection unit 164 (FIG. 2) can detect dissolved solid data. The dissolved solid data can indicate an amount of dissolved solid in the concentrate 140. The dissolved solid data can include, for example, concentrate conductivity data indicating a conductivity of the concentrate 140. The conductivity of the concentrate 140 can indicate, for example, an amount of dissolved solids in the concentrate 140.

The valve 190 can control the output of the concentrate 140. The valve 190 can thus control, for example, the pressure of the concentrate 140 exiting the filtration unit 162.

Referring back to FIG. 2, the first and the second portion of the permeate 126 are delivered to the liquid utilization system 128 for general use as necessary. For example, the permeate 126 can be used to distill edible liquid products. The permeate 126 can also be used for the manufacture of materials which require filtered liquids. The liquid utilization system 128 can include, for example, the flow sensor 200, the dissolved solid detection unit 168, and the pressure sensor 178.

The flow sensor 200 can detect, for example, flow rate data such as permeate flow rate data. The permeate flow rate data can include an aggregate or average permeate flow rate of the liquid utilization system 166. The permeate flow rate of the liquid utilization system 166 can be, for example, a flow rate corresponding to the permeate 126 entering the liquid utilization system 166.

The dissolved solid detection unit 168 can detect dissolved solid data. The dissolved solid data can indicate an amount of dissolved solid in the permeate 126. The dissolved solid data can include, for example, permeate conductivity data indicating a conductivity of the permeate 126. The conductivity of the permeate 126 can indicate, for example, an amount of dissolved solids in the permeate 126.

The pressure sensor 178 can detect pressure data. The pressure data can indicate a pressure in the permeate 126. The pressure data can include, for example, permeate pressure data indicating a pressure of the permeate 126.

The control system 170 is connected to the reverse osmosis unit 166 and can receive the operational data of the reverse osmosis unit 166. The control system 170 can analyze the operational data of the reverse osmosis unit 166 to determine a normalized permeate flow rate. The control system 170 can use the normalized permeate flow rate to determine whether the reverse osmosis unit 166 should be operated in a different manner to improve yield of the permeate or whether the filters in the filter banks need to be cleaned or replaced. The control system 170 can store the operational data in the memory 172, and more specifically in a database 174 in the memory 172. The control system 170 can also use prior operational data, and equations stored in the memory 172 to determine the normalized flow rate.

The normalized flow rate can be, for example, a normalized permeate flow rate indicating a normalized flow rate of the permeate 126. The normalized flow rate of the permeate 126 takes into account variations in the flow rate of the permeate caused by factors such as a low or high temperature of the feed liquid and/or an amount of dissolved solids in the feed liquid. The normalized flow rate of the permeate 126 can be a more accurate reflection of the flow rate of the permeate 126 and provide a better indication of whether the filters 142 and 144 in the filter banks 120 and 132 should be cleaned and/or replaced.

The normalized flow rate can be calculated for example, using the equation:

normalized permeate flow rate={160/[net driving pressure(avg)]}*[permeate flow rate]*[temp correction factor].

For example, the "160" is a conversion factor to metric and the "permeate flow rate" is detected by the flow sensor 200 in the liquid utilization system 128.

The "net driving pressure (avg)," for example, is calculated using the equation:

net driving pressure(avg)=[feed liquid pressure]+{[permeate conductivity]/100}−{{{[feed liquid conductivity]+[concentrate conductivity]}/2}/200}−{{[feed liquid pressure]−[second stage rejection pressure]}/2}−[permeate pressure].

For example, the "feed liquid pressure" is detected by the pressures sensor 110 in the pump 108, the "permeate conductivity" is detected by the dissolved solid detection unit 168 in the liquid utilization system 128, the "feed liquid conductivity" is detected by the dissolved solid detection unit 116 in the pump 108, the "concentrate conductivity" can be detected by the dissolved solid detection unit 164, the "second stage rejection pressure" is detected by the pressure sensor 134 in the filter bank 132, and the "permeate pressure" is detected by the pressure sensor 178 in the liquid utilization system 128.

The "temperature correction factor" is calculated using the equation:

temperature correction factor=EXP{3480*{1/298−1/{273+25}}}/EXP{3480*{1/298−1{273+[feed liquid temperature]}}}.

For example, the feed liquid temperature is detected by the temperature sensor 114 in the pump 108.

Figure 5:
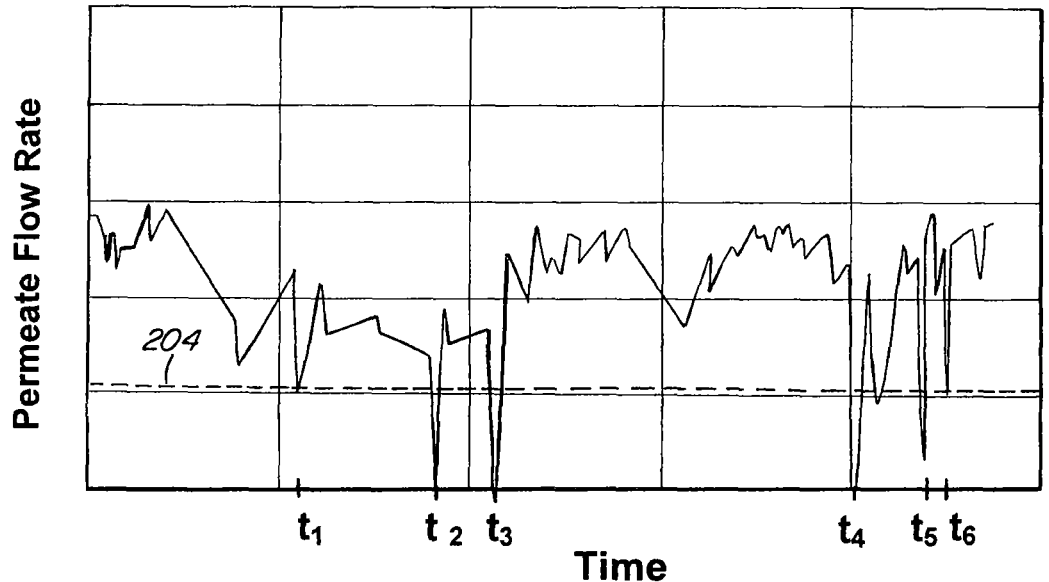
FIG. 5 is a graph of a permeate flow rate according to an embodiment of the present invention.

Referring to FIG. 5, a permeate flow rate graph can have a minimum permeate flow rate threshold 204. Thus, when the permeate flow rate detected, for example, by the flow sensor 200 in the liquid utilization system 128 drops below a predetermined minimum permeate flow rate threshold 204, a warning or alert can be displayed on the display 176 (FIG. 1) indicating that the filters 142 and/or 144 should be cleaned and/or replaced.

However, in FIG. 5, the permeate flow rate drops below the predetermined minimum flow rate numerous times, such as at time t1, t2, t3, t4, t5, and t6. However, the permeate flow rate fluctuates widely because of varying feed liquid 106 and membrane conditions in the filters 142 and/or 144. This can result in a false positive or the indication that the filters 142 and/or 144 need to be cleaned and/or replaced when actually they do not need to be cleaned and/or replaced. Excessive cleaning of the filters 142 and/or 144 can result in damage to the filters 142 and/or 144, necessitating their replacement. Furthermore, excessive replacement of the filters 142 and/or 144 can be expensive.

Figure 6:
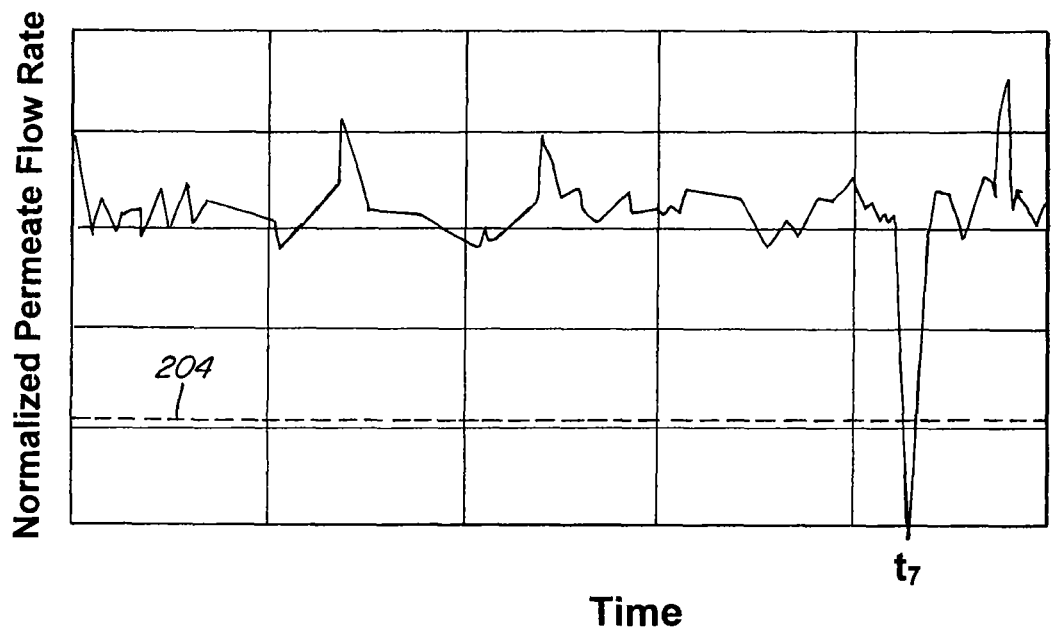
FIG. 6 is a graph of a normalized permeate flow rate according to an embodiment of the present invention.

FIG. 6 depicts a graph of a normalized permeate flow rate over time. As can be seen, the normalized permeate flow rate does not fluctuate widely, reducing the likelihood of false positives, and the number of times the normalized permeate flow rate drops below the predetermined minimum flow rate. In FIG. 6, the normalized permeate flow rate drops below the predetermined minimum flow rate threshold 204 at time t7, which is between the time t4 and time t5 in FIG. 5. Thus, by using the normalized permeate flow rate, the amount of times that the filters 142 and/or 144 are cleaned and/or replaced can be reduced, for example, from 6 times to 1.

The control system 170 can also use a percent recovery, a percent rejection, a normalized pressure differential, a first pressure differential, a second pressure differential, and/or an interstage pressure differential to determine whether the reverse osmosis unit 166 should be operated in a different manner to improve yield of the permeate, or whether the filters in the filter banks need to be cleaned or replaced.

The percent recovery can be calculated, for example, using the following equation:

percent recovery=[permeate flow rate]/[feed liquid flow rate]*100.

For example, the "permeate flow rate" can be detected by the flow sensor 200 in the liquid utilization system 128 and the "feed liquid flow rate" can be detected by the flow sensor 112 in the pump 108.

The percent rejection can be calculated, for example, using the following equation:

percent rejection={{{[feed liquid conductivity]+[concentrate conductivity]}/2}−[permeate conductivity]}/{{[feed liquid conductivity]+[concentrate conductivity]}/2}*100.

For example, the "feed liquid conductivity" can be detected by the dissolved solid detection unit 116, the "concentrate conductivity" can be detected by the dissolved solid detection unit 164, and "the permeate conductivity" can be detected by the dissolved solid detection unit 168 in the liquid utilization system 128.

The normalized pressure differential can be calculated, for example, using the following equation:

normalized pressure differential={[feed liquid pressure]−[second stage rejection pressure]}*{2*{50+200}^1.5}/{2*{[concentrate flow rate]+[permeate flow rate]}^1.5}.

For example, the "feed liquid pressure" can be detected by the pressure sensor 110 in the pump 108, the "second stage rejection pressure" can be detected by the pressure sensor 134 in the filter bank 132, the "concentrate flow rate" can be detected by the flow sensor 136 in the filter bank 132, and the "permeate flow rate" can be detected by the liquid utilization system 128.

Furthermore, the first pressure differential, the second pressure differential, and the interstage pressure differential can be calculated to determine if there are any problems within the filter bank 120 and/or the filter bank 132. The first pressure differential can indicate, for example, the pressure on the filters 142, and the second pressure differential can indicate, for example, the pressure on the filters 144. The first pressure differential, the second pressure differential, and/or the interstage pressure differential can indicate whether the filters 142 and 144 should be replaced or cleaned. Also, the first pressure differential, the second pressure differential, and/or the interstage pressure differential can indicate whether it is safe to increase the feed liquid pressure in order to improve the yield of the permeate. Too much pressure on the filters 142 and/or the filters 144 can lead to the destruction of the filters 142 and/or the filters 144.

The first pressure differential can be calculated using the equation below:

first pressure differential=[feed liquid pressure]−[first stage rejection pressure].

For example, the "feed liquid pressure" can be detected by the pressure sensor 110 in the pump 108, and the "first stage rejection pressure" can be detected by the pressure sensor 122 in the filter bank 120.

The second pressure differential can be calculated using the equation below:

second pressure differential=[first stage rejection pressure]−[second stage rejection pressure].

For example, the "first stage rejection pressure" can be detected by the pressure sensor 122 in the filter bank 120, and the "second stage rejection pressure" can be detected by the pressure sensor 134 in the filter bank 132.

The interstage pressure differential can be calculated using the equation below:

interstage pressure differential=[feed liquid pressure]−[second stage rejection pressure].

For example, the "feed liquid pressure" can be detected by the pressure sensor 110 in the pump 108, and the "second stage rejection pressure" can be detected by the pressure sensor 134 in the filter bank 132.

By determining the percent recovery, the percent rejection, the normalized pressure differential, the first pressure differential, the second pressure differential, and/or the interstage pressure differential, the pressures and flow rate of the feed liquid, the concentrate, and/or the permeate can be manipulated to increase the percent recovery without damaging the filters 142 and/or 144. The percent recovery can be, for example, increased to be above 75%, which in one embodiment can be an ideal minimum recovery rate.

Figure 7:
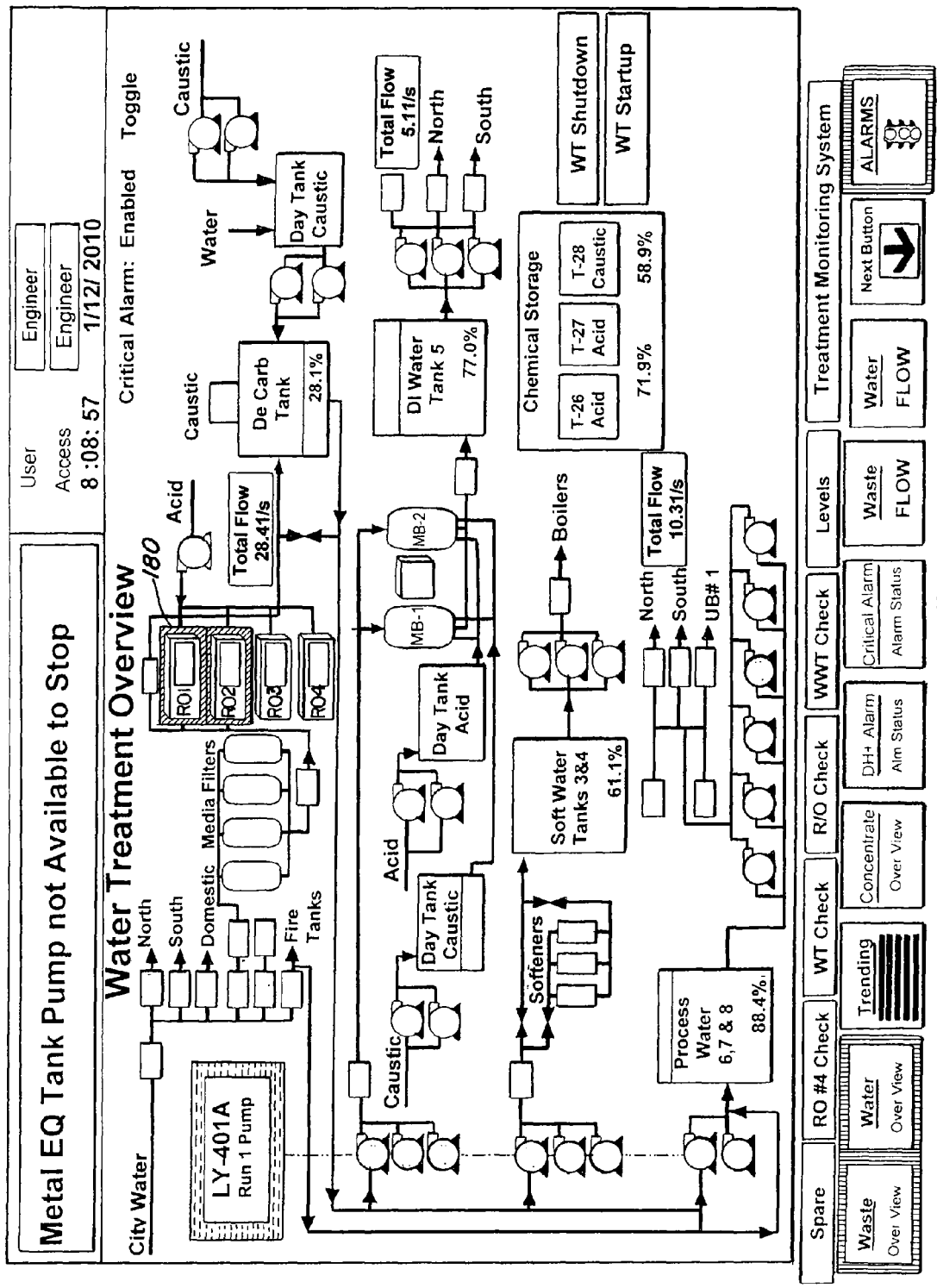
FIG. 7 depicts a display screen according to an embodiment of the present invention.
Figure 8:
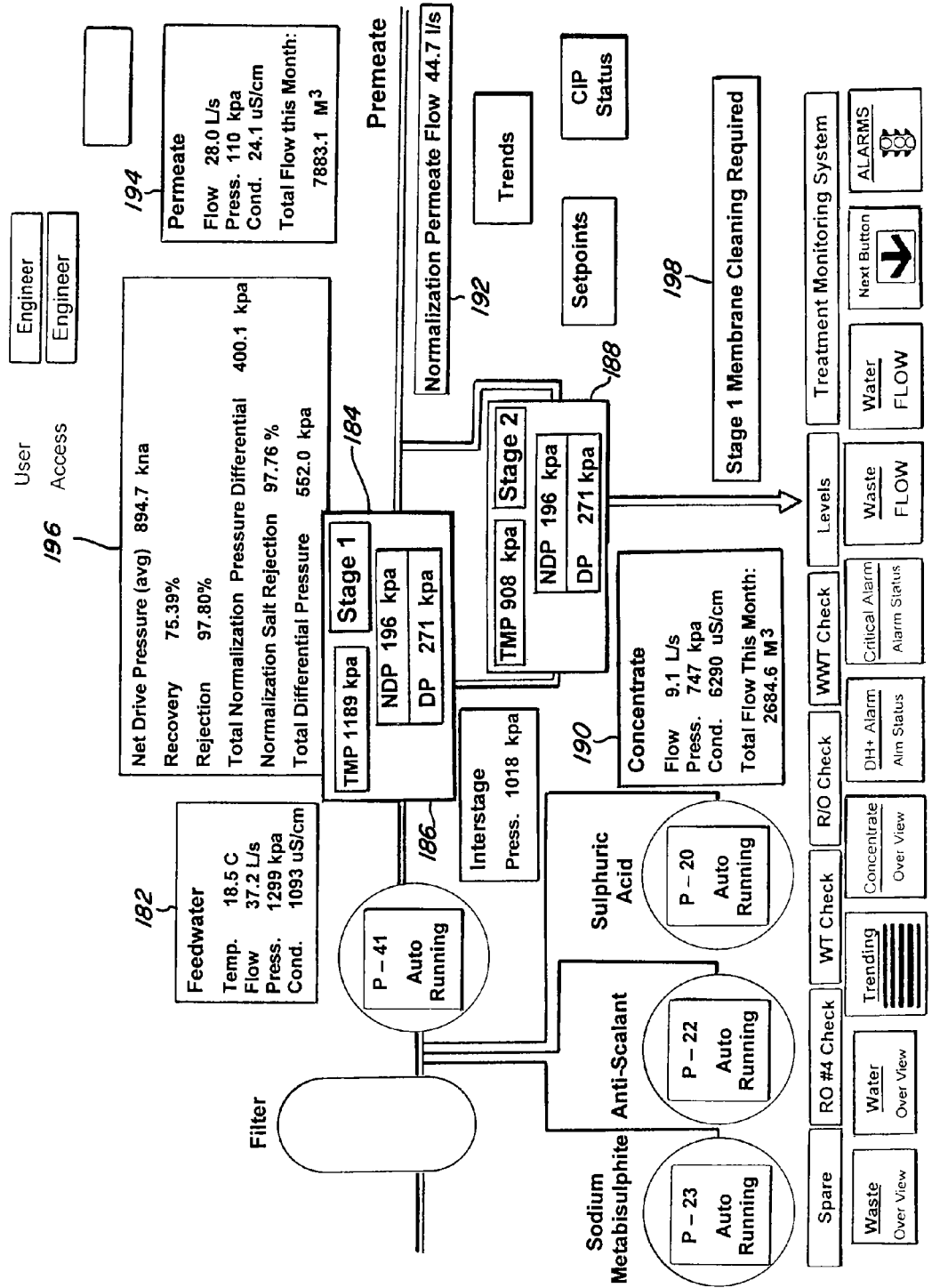
FIG. 8 depicts a display screen according to an embodiment of the present invention.

The control unit can also control the display 176 to display relevant information as seen in FIGS. 7 and 8. In FIG. 7, when the filters 142 and/or 144 or additional filters need to be cleaned and/or replaced, the display 176 can so indicate as shown in the shaded region 180 in FIG. 7. R01, R02, R03, and/or R04 can correspond, for example, to the filters within the filters 142 and/or 144.

Furthermore, information such as the data regarding the operation of the reverse osmosis unit 166 can be displayed on display 176 as shown in FIG. 8. In FIG. 8, display portion 182 can indicate feed liquid information such as the feed liquid temperature, the feed liquid flow rate, the feed liquid pressure, and/or the feed liquid conductivity. The feed liquid temperature can correspond to the feed liquid temperature data detected by the temperature sensor 114, the feed liquid flow rate can correspond to the feed liquid flow rate data detected by the flow sensor 112, the feed liquid pressure can correspond to the feed liquid pressure data detected by the pressure sensor 110, and the feed liquid conductivity can correspond to the feed liquid conductivity data detected by the dissolved solid detection unit 116.

The display portion 184 can indicate first filter bank information such as the first pressure differential. The first pressure differential can be calculated using the equations disclosed above. The display portion 186 can indicate the interstage pressure differential. The interstage pressure differential can be calculated using the equations disclosed above. The display portion 188 can indicate second filter bank information such as the second pressure differential. The second pressure differential can be calculated using the equations disclosed above.

The display portion 190 can indicate concentrate information such as the concentrate flow rate, the concentrate pressure, and/or the concentrate conductivity. The concentrate flow rate can correspond to the rejection flow rate data detected by the flow sensor 136, the concentrate pressure can correspond to the rejection pressure data detected by the pressure sensor 134, the concentrate conductivity can correspond, for example, to the dissolved solid data detected by the dissolved solid detection unit 164.

The display portion 192 can indicate the normalized permeate flow rate. The normalized permeate flow rate can be calculated using the equations disclosed above.

The display portion 194 can indicate permeate information such as permeate flow rate, permeate pressure, and/or permeate conductivity. The permeate flow rate can correspond to the permeate flow rate data detected by the flow sensor 200, the permeate pressure can correspond to the permeate pressure data detected by the pressure sensor 178, and the permeate conductivity can correspond to the permeate conductivity data detected by the dissolved solid detection unit 168.

The display portion 196 can indicate overall operation information such as the net driving pressure, the percent recovery, the percent rejection, and the normalized pressure differential. The net driving pressure, the percent recovery, the percent rejection, and the normalized pressure differential can be calculated using the equations disclosed above. The display portion 198 can indicate, for example, information regarding the cleaning and/or replacement requirements for the filters 142 and/or 144.

Figure 9:
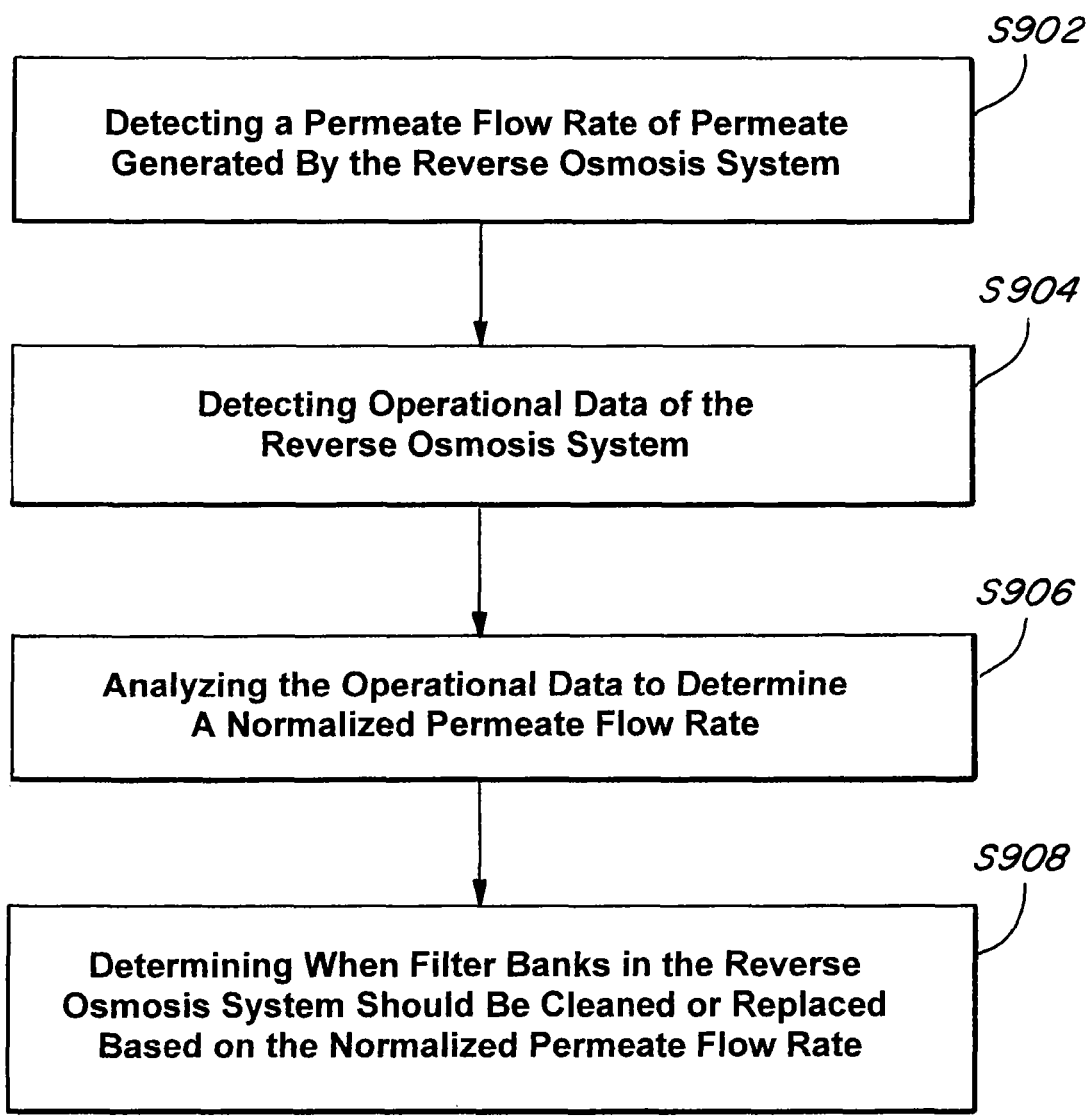
FIG. 9 depicts a process according to an embodiment of the present invention.

In one embodiment, the present invention is a process as disclosed in FIG. 9. In Step S902, a permeate flow rate of permeate generated by the reverse osmosis system is detected. For example, the pressure sensor 178 can detect permeate flow rate data to indicate a flow rate of the permeate 126. In Step S904, the operation data of the reverse osmosis system is detected. For example, the instrumentation system 168 can be used to detect the operational data of the reverse osmosis system. In Step S906, the operational data is analyzed to determine a normalized permeate flow rate. For example, the operational data detected by the instrumentation system 168 can be analyzed by the control system 170. In Step S908, a determination can be made as to whether the filter banks in the reverses osmosis system should be cleaned or replaced based on the normalized permeate flow rate. For example, based on the normalized permeate flow rate, the control system 170 can provide an indication on the display 176 as to whether the filters 142 and/or 144 in the filter banks 120 and/or 132 should be cleaned or replaced.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A reverse osmosis system comprising:
a reverse osmosis unit including a plurality of filter banks configured to pass permeate and generate concentrate;
an instrumentation unit coupled to the reverse osmosis unit and having a plurality of sensors for sensing operational data of the reverse osmosis unit, the plurality of sensors including a flow sensor configured to detect a permeate flow rate of the permeate and a dissolved solid detection unit configured to detect an amount of dissolved solids in the concentrate;
a processor coupled to the instrumentation unit and configured to calculate a normalized permeate flow rate based on the operational data including the permeate flow rate and the amount of dissolved solids in the concentrate and to determine whether to clean or replace the plurality of filter banks based on the normalized permeate flow rate; and
a display coupled to the processor and configured to display data indicating whether to clean or replace at least one of the plurality of filter banks.

2. The system of claim 1 wherein the reverse osmosis unit is configured to receive feed liquid, the instrumentation unit includes a temperature sensor configured to detect a temperature of the feed liquid, and the operational data includes the temperature of the feed liquid.

3. The system of claim 1 wherein the instrumentation unit includes a second flow sensor configured to detect a concentrate flow rate of the concentrate and the operational data includes the concentrate flow rate.

4. The system of claim 1 wherein the reverse osmosis unit is configured to receive feed liquid, the instrumentation unit includes a second dissolved solid detection unit configured to detect an amount of dissolved solids in the feed liquid, and the operational data includes the amount of dissolved solids in the feed liquid.

5. The system of claim 1 wherein the reverse osmosis unit is configured to receive feed liquid, the instrumentation unit includes a first pressure sensor configured to detect a feed pressure of the feed liquid, and the operational data includes the feed pressure.

6. The system of claim 5 wherein:
the plurality of filter banks includes a first filter bank and a second filter bank,
the second filter bank is configured to receive a concentrate of the first filter bank,
the instrumentation unit includes a second pressure sensor configured to detect a rejection pressure of the first filter bank corresponding to a pressure of the concentrate of the first filter bank, and
the operational data includes a first pressure differential indicating a pressure differential between the feed pressure and the rejection pressure of the first filter bank.

7. The system of claim 6 wherein the instrumentation unit includes a third pressure sensor configured to detect a rejection pressure of the second filter bank corresponding to a pressure of a concentrate of the second filter bank, and the operational data includes a second pressure differential indicating a pressure differential between the rejection pressure of the first filter bank and the rejection pressure of the second filter bank.

8. The system of claim 7 wherein the processor is further configured to analyze the first pressure differential and the second pressure differential to determine whether to increase or decrease the feed pressure.

9. The system of claim 8 wherein the instrumentation unit includes a recovery detection unit configured to detect a percent recovery of the feed liquid, and the operational data includes the percent recovery of the feed liquid.

10. The system of claim 9 wherein the processor is further configured to determine whether to increase or decrease the feed pressure based on the percent recovery of the feed liquid, the first pressure differential, and the second pressure differential.

11. A reverse osmosis system comprising:
a reverse osmosis unit including a first filter bank and a second filter bank and configured to receive feed liquid, pass permeate and generate concentrate;
a first pressure sensor configured to detect a feed pressure of the reverse osmosis unit;
a second pressure sensor configured to detect a rejection pressure of the first filter bank corresponding to a pressure of concentrate of the first filter bank;
a third pressure sensor configured to detect a rejection pressure of the second filter bank corresponding to a pressure of concentrate of the second filter bank;
a permeate sensor configured to detect a permeate flow rate of the permeate;
a dissolved solid detection unit configured to detect an amount of dissolved solids in the concentrate of the reverse osmosis unit;
a processor configured to calculate a normalized permeate flow rate based on the feed pressure, the rejection pressure of the first filter bank, the rejection pressure of the second filter bank, the permeate flow rate and the amount of dissolved solids in the concentrate, determine whether to clean or replace at least one of the first filter bank or the second filter bank based on the normalized permeate flow rate and determine whether a yield of the permeate can be improved based on the normalized permeate flow rate; and a display connected to the control unit and configured to indicate when to clean or replace at least one of the first filter bank or the second filter bank.

12. The system of claim 11 wherein the processor is further configured to determine a first pressure differential indicating a first pressure differential between the feed pressure and the rejection pressure of the first filter bank, and a second pressure differential indicating a pressure differential between the rejection pressure of the first filter bank and the rejection pressure of the second filter bank.

13. The system of claim 12 further comprising a recovery detection unit for detecting a percent recovery of the feed liquid, wherein the processor is further configured to determine whether to increase or decrease the feed pressure based on the percent recovery of the feed liquid, the first pressure differential, and the second pressure differential.

14. The system of claim 13 further comprising a temperature sensor configured to detect a temperature of the feed liquid, and a second dissolved solid detection unit configured to detect an amount of dissolved solids in the feed liquid, wherein the processor is further configured to determine whether to clean or replace at least one of the first filter bank or the second filter bank based on the percent recovery of the feed liquid and the amount of dissolved solids in the feed liquid.

15. A system comprising:
a first filter for receiving feed liquid, generating a first concentrate and passing a first portion of a permeate;
a second filter for receiving the first concentrate, generating a second concentrate and passing a second portion of the permeate;
an initial pressure sensor configured to detect a pressure of the feed liquid;
a first pressure sensor configured to detect a pressure of the first concentrate;
a second pressure sensor configured to detect a pressure of the second concentrate;
a flow sensor configured to detect a flow rate of the permeate;
a dissolved solid detection unit configured to detect an amount of dissolved solids in at least one of the first concentrate or the second concentrate;
a processor configured to calculate a normalized flow rate based on the pressure of the feed liquid, the pressure of the first concentrate, the pressure of the second concentrate, the flow rate of the permeate, and the amount of dissolved solids in the at least one of the first concentrate or the second concentrate, determine a normalized pressure differential based on the pressure of the feed liquid and the flow rate of the permeate, determine whether a percentage of the permeate relative to the feed liquid can be increased based on the normalized pressure differential, and determine whether to clean or replace at least one of the first filter or the second filter based on the normalized flow rate; and
a display configured to output data corresponding to the determination of whether to clean or replace the at least one of the first filter or the second filter.

16. The system of claim 15 wherein the processor is further configured to determine a first pressure differential between the pressure of the feed liquid and the pressure of the first concentrate, and a second pressure differential between the pressure of the first concentrate and the pressure of the second concentrate.

17. The system of claim 16 further comprising a recovery detection unit configured to detect a percent recovery of the feed liquid corresponding to a ratio between an amount of received feed liquid and an amount of passed permeate, wherein the processor is further configured to determine whether to increase or decrease the pressure of the feed liquid based on the percent recovery of the feed liquid, the first pressure differential, and the second pressure differential.

18. The system of claim 17 further comprising a temperature sensor configured to detect a temperature of the feed liquid, a second flow sensor configured to detect a flow rate of the feed liquid, and a second dissolved solid detection unit configured to detect an amount of dissolved solids in the feed liquid, wherein the processor is further configured to determine whether to clean or replace the first filter or the second filter based on the temperature of the feed liquid, the flow rate of the feed liquid, and the amount of dissolved solids in the feed liquid.

* * * * *